Figure 1:
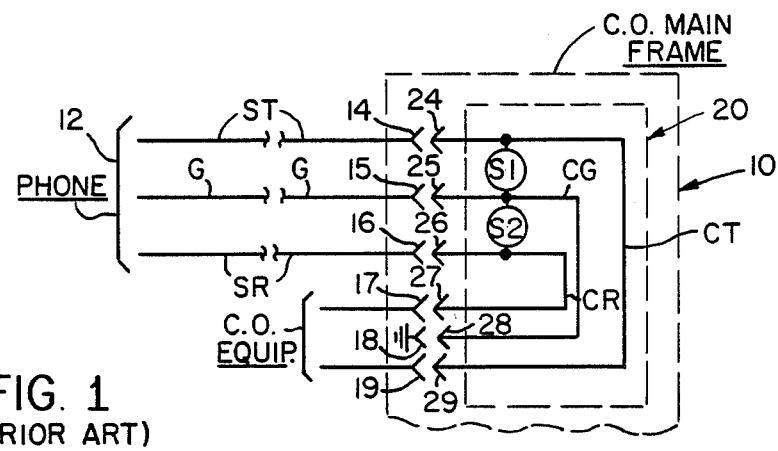

United States Patent [19]

Teumer et al.

[11] Patent Number: 4,945,555
[45] Date of Patent: Jul. 31, 1990

[54] METHOD AND MEANS FOR REMOTE TESTING OF UNUSED TELEPHONE LINES

[75] Inventors: Christopher R. Teumer; Mark A. Mendes, both of Rochester, N.Y.

[73] Assignee: Rochester Telephone Corporation, Rochester, N.Y.

[21] Appl. No.: 418,241

[22] Filed: Oct. 6, 1989

[51] Int. Cl.$^5$ .............................................. H04B 3/46
[52] U.S. Cl. ........................................ 379/21; 379/22; 379/27; 379/5; 379/26
[58] Field of Search ..................... 379/22, 27, 5, 6, 21, 379/26

[56] References Cited

U.S. PATENT DOCUMENTS 4,756,017  7/1988  Bush ..................................... 379/22

Primary Examiner—Stafford D. Schreyer
Attorney, Agent, or Firm—Shlesinger Fitzsimmons Shlesinger

[57] ABSTRACT

A pair of unused telephone lines are connected together at a telephone office main frame by a device which is removably plugged in the main frame to connect a diode between said lines. At a point remote from the central office a testing circuit, which comprises a battery in series with a tone emitter, is releasably connected across the lines first with one polarity with respect to the lines, and then with the opposite polarity. If a tone is emitted for only one connection but not the other, the lines should be in working order.

16 Claims, 1 Drawing Sheet

U.S. Patent      Jul. 31, 1990      4,945,555

METHOD AND MEANS FOR REMOTE TESTING OF UNUSED TELEPHONE LINES

BACKGROUND OF THE INVENTION

This invention relates to telephone service lines, and more particularly to a novel method and means for selecting and testing unused telephone lines at points remote from a central office.

As a general rule, most telephone companies in metropolitan areas utilize a plurality of so-called central offices, each of which services a large number of telephone circuits for individual subscribers. Each telephone circuit, such as for example the circuit to an individual residential subscriber, includes two telephone lines or cables, one of which is known as the ring line, and the other which is known as the tip line. The circuit which services a given subscriber's telephone can also include a third line known as a ground line.

Most of the pairs of tip and ring lines emanating from a central office are connected to respectively different telephones; but others of such pairs constitute unused lines which are available for connection to the telephone of a new subscriber. This present invention is concerned only with unused pairs of telephone lines.

In order to connect a new subscriber to a pair of unused telephone lines, it is customary for a worker to travel to the premises of the new subscriber, and to install the telephone by climbing a nearby telephone pole to investigate one-by-one the numerous pairs of telephone lines which pass through an overhead cable. The worker employs a conventional instrument for testing each pair of lines, and if a dial tone is heard, the existence of the tone indicates that that particular pair of lines (tip and ring) are in use. On the other hand, if the worker finds a pair of lines that do not exhibit a dial tone, he realizes that, presumably, he has found an unused pair of lines which can then be connected to the new subscriber's telephone.

However, before connecting the new telephone to the selected pair of tip and ring lines, the worker must first test the lines to make sure that they have not become accidentally shorted or severed at some point between the subscriber's home and the central office, thus making sure at the outset that the pair of lines are operative, though unused. Heretofore in order to conduct such a test it was customary for the worker to call someone at the central office, and to have that person test the selected pair of lines to make sure that the new subscriber's phone can be rung up, or rung through, the central office. This is a time consuming and expensive operation.

Instruments are available for testing telephone lines, but both the equipment and the purpose are different from the present invention. U.S. Pat. No. 4,350,849, for example, discloses a line testing device which utilizes a varying impedance to test whether or not a subscriber line is satisfactory or unsatisfactory because of some failure. However, the testing is conducted from the telephone central office, rather than in the field at a point remote from the office; and the testing elements are located at the central office, and are not used for testing unused telephone subscriber lines.

U.S. Pat. No. 3,951,248 discloses a line status indicating device which is located on the subscriber's premises, but it is not used for testing unused telephone lines. It merely indicates at one extension phone, when another extension phone on the same line is being employed.

U.S. Pat. No. 4,513,179 discloses a loop testing device, but it is designed specifically for using a jack with a wall socket, which terminates a telephone or other electrical circuit. The device disclosed in U.S. Pat. 3,976,849 also is designed for a purpose which is entirely unrelated to this invention, since the device in this patent is intended to be substituted in place of a telephone. The U.S. Pat. No. 4,596,904 has for its purpose the identification of individual telephone lines at the end of a trunk cable, but it functions only in connection with a closed system, for example an in-house PBX system. This system and method cannot be applied for detecting the presence of unused pairs of telephone lines as between a subscriber's telephone, and a remote central office main frame.

It is an object of this invention, therefore, to provide a novel method for permitting a lone worker in the field, not only to select an unused pair of tip and ring lines for use of the new subscriber's telephone, but also to conduct a test, remote from the central office, to determine whether or not the selected pair of lines are in an operative condition—i.e., have not been severed or shorted out.

Still another object of this invention is to provide for a novel method of the type described improved means for conducting a remote test of unused telephone lines prior to connecting the new subscriber's telephone to a selected pair of tip and ring lines, respectively.

Other objects of the invention will be apparent hereinafter from the specification and from the recital of the appended claims, particularly when read in conjunction with the accompanying drawing.

SUMMARY OF THE INVENTION

At the central office each incoming pair of unused tip and ring lines is connected to and terminates at a so-called frame signature device or module, which is removably plugged into the central office main frame. Each such module comprises a light emitting diode connected across the ends of the incoming pair of tip and ring lines; and if desired, the module may include protector devices connected between the usual incoming sleeve or ground line and each of the tip and ring lines, respectively.

When a worker is dispatched to connect a new subscriber's phone to the central office, the worker travels to the site of the new subscriber, and, for example, climbs a nearby telephone pole to select a pair of unused tip and ring lines from among many lines carried in a cable on the pole. The worker first uses a conventional dial tone sensing device to locate a pair of unused lines. This is done by connecting the device across a selected pair of lines (tip and ring), and if an audible tone is detected the worker realizes that that particular pair is in use. Other pairs of lines in the cable are similarly tested until the worker finds a pair which does not produce a dial tone. The absence of the tone indicates that the two lines are not in use.

However, before connecting the selected lines to the new subscriber's phone, the worker tests for line failure by twice connecting across the selected pair of lines a nine volt battery, which is connected in series with a conventional tone emitter. The first connection is made with the battery having one polarity with respect to the lines, and the second connection is made simply by reversing the connections to apply a voltage of opposite polarity across the lines. If the two selected lines are in proper order—i.e., have not shorted out or become severed somewhere between the worker and the central office—the emitter will produce an audible tone for one connection, as when the light emitting diode of the associated signature module at the central office is biased forwardly, but will not emit a tone for the opposite connection. This would indicate that the selected pair of lines are in proper working order, and that they may then be connected to the new subscriber's phone.

THE DRAWING

Figure 2:
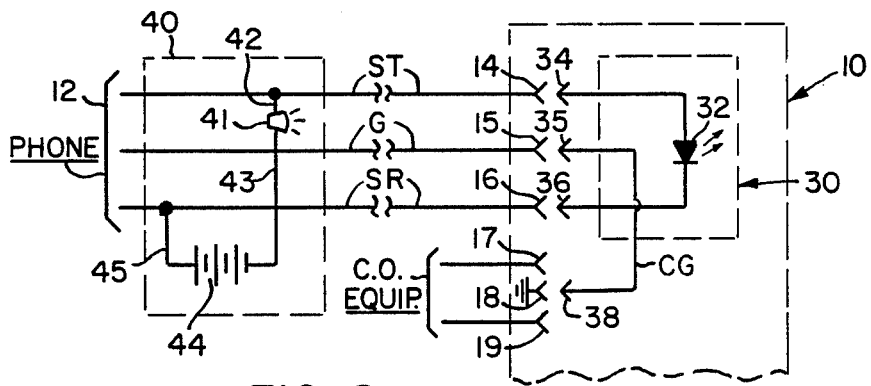
Figure 3:
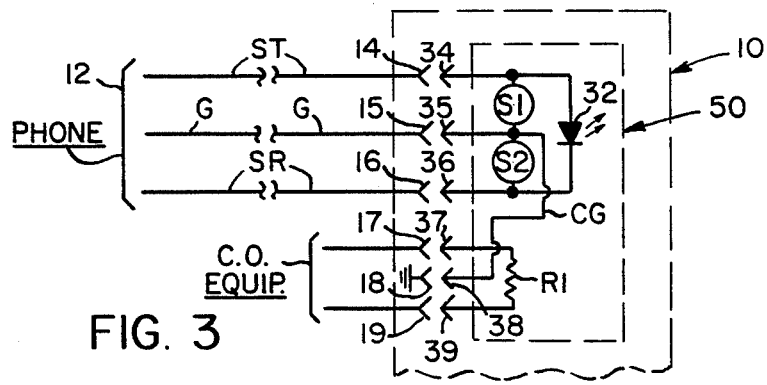

FIG. 1 is a wiring diagram illustrating fragmentarily and schematically conventional apparatus for connecting telephone tip and ring lines through a central office main frame to the central office equipment for operation thereby; and FIG. 2 is a wiring diagram generally similar to FIG. 1, but showing apparatus made according to this invention for connecting unused tip and ring lines to the main frame so that the lines can be tested from a point remote from the central office;

FIG. 3 is a modified form of the apparatus shown in FIG. 2.

PREFERRED EMBODIMENTS OF THE INVENTION:

Referring now to the drawing by numerals of reference, and first to FIG. 1, 10 denotes generally a portion of a main wiring frame that is located at a telephone company central office. This frame is utilized for selectively connecting central office equipment to customer service lines, which emanate from the central office frame to various telephone subscribers. More specifically, 12 denotes a single telephone which is located on a subscriber's premises remote from the central office. The telephone is connected to the central office by a conventional pair of tip and ring lines which in FIG. 1 are denoted at ST and at SR, to denote the subscriber's tip and ring lines, respectively. Illustrated also in FIG. 1 is a sleeve or ground line G, which for purposes of illustration is shown to extend from the remote telephone 12 to the main frame 10.

Although the wiring for only a single telephone 12 has been illustrated in FIG. 1, it will be understood, of course, that the main frame 10 will contain a large number of similar connections for accommodating the tip, ring and ground lines of numerous telephones.

At the main frame 10 the incoming subscriber lines ST, G and SR are connected to sockets 14, 15 and 16, respectively. The central office equipment lines that are adapted to supply signals to the subscriber ring, ground and tip lines SR, G and ST, respectively, are connected to the additional main frame sockets 17, 18 and 19. Accordingly, when it is desired to connect the phone 12 to the central office equipment for operation thereby, it has been customary heretofore to utilize, for example, a conventional family connector module of the type denoted generally by the numeral 20 in FIG. 1. This module includes six pins 24, 25, 26, 27, 28 and 29, which are insertable removably into the sockets 14 through 19, respectively. Pins 24 and 28 of the module 20 are interconnected by a central office tip line CT, pins 25 and 28 by a line CG, and the pins 26 and 27 by a central office ring line CR. Thus, when the module 20 is inserted properly into the main frame, the subscriber tip, ground and ring lines ST, G and SR will be connected through the module 20 and the lines CT, CG and CR with the appropriate central office equipment lines which are connected to sockets 17, 18 (grounded) and 19.

Also as shown in FIG. 1 the ground line G is connected through the pin 25 and through two different safety devices S1 and S2 with the lines CT and CR, respectively. The safety devices S1 and S2 may comprise conventional carbon protection devices or tube protection devices which customarily are incorporated in connector modules 20 to protect the latter against sudden voltage or power surges which might originate in the customer equipment. Obviously when the module 20 is removed from the main frame, the tip and ring lines ST and SR will be so-called unused tip and ring lines. On the other hand when the module 20 is inserted into the main frame as shown in FIG. 1, the central office equipment can be utilized to operate the phone 12.

Referring now to FIG. 2, wherein like numerals are employed to denote elements similar to those employed in FIG. 1, the module 20 has been replaced by a novel, four-pin module 30, which includes pins 34, 35, 36 and 38 that are removably inserted into the main frame sockets 14, 15, 16 and 18, respectively. Moreover, instead of the pins 34 and 36 being connected to the central office equipment, they are instead connected to the anode and cathode, respectively, of a light emitting diode 32, which is mounted in and forms a part of the module 30.

In the embodiment illustrated in FIG. 2, the ground pin 35 on module 30 is connected by line CG to ground pin 18 at the central office. Also, it will be noted that the receptacles 17 and 19 as shown in FIG. 2 are not connected either by the module 30 or by any other electrical connection to the subscriber lines ST and SR. Consequently, the central office equipment will not be providing a dial tone to the phone 12; and lines ST and SR therefore will constitute a pair of unused tip and ring lines, respectively.

It will be understood that the unused tip and ring lines ST and SR, as illustrated in FIG. 2, constitute only one of numerous pairs of telephone line circuits which emanate from the central office, and which extend through a cable or the like, that is located near the residence of the subscriber for phone 12. Therefore, when it is desired to connect one such pair of unused lines to the phone 12 as is shown in FIG. 2, a worker or operator travels to the site of the subscriber phone 12, and, for example, climbs a nearby telephone pole to gain access to the aforementioned cable, and searches for a pair of unused tip and ring lines, respectively, from which no dial tone can be detected. Assuming that the worker finds the two lines ST and SR, as shown in FIG. 2, the operator then utilizes the instrument 40 to determine whether or not the lines ST and SR are in working order—i.e., are not shorted or otherwise severed at some point between the phone 12 and the central office.

The instrument 40 includes an electrically operated tone emitter 41 connected at one side to a wire lead 42, and at its opposite side through a line 43 and battery 44 to another lead 45. To test the lines ST and SR the worker first connects line 42 to the tip line ST, and line 45 to the ring line SR, which in the embodiment illustrated would apply a reverse bias to the diode 32. With instrument 40 thus connected, diode 32 would prevent any current flow through instrument 40, and therefore would prevent operation of its tone emitter 41. Thereafter the worker reverses the connection of the instrument 40 by connecting lead 42 to the line SR and lead 45 to the line ST, thus biasing the diode 32 forwardly so that current will flow through the circuit in instrument 40, and will thus cause the tone indicator 41 to emit an audible signal Since the tone emitter 41 was energized only when lines ST and SR were subjected to one voltage polarity, as distinguished from the other, the worker can surmise that the lines ST and SR are satisfactorily connected to the central office.

The foregoing testing operation, of course, can be conducted without the aid of anyone at the central office. However, in the event that it may be of interest to someone at the central office, when the diode 32 is in fact biased forwardly, and conducts, the light emitted by the diode will be visable through a window or transparency in the module 30 to an operator or a worker at the central office. However, as noted above, it is not necessary that anyone at the central office perform any operation in order to indicate to the worker in the field that the tip and ring lines ST and SR are in fact properly connected to the main frame.

Having established that the lines ST and SR are satisfactory, the worker in the field can then connect the lines to the subscriber's phone 12. Thereafter, it will be necessary for someone at the central office to remove the module 30, and to insert in its place, a conventional module of the type denoted at 20 in FIG. 1, thus to complete the connection of the central office equipment to the phone 12.

Referring now the embodiment shown in FIG. 3, where like numerals again are employed to denote elements similar to those shown in the first embodiment, 50 denotes generally a modified module made according to a second embodiment of this invention. This module includes the light emitting diode 32 the anode and collector of which are connected, as in the preceding embodiment, to the pins 34 and 36, respectively. Also, a safety device S1 is connected between pin 34 and the ground pin 35, while another safety device S2 is connected between ground pin 35 and pin 36. The devices S1 and S2 thus guard against any undesirable surges which might originate in the subscriber tip and ring lines ST and SR.

Also in this embodiment, the module 50 includes pins 37, 38 and 39, which are removably inserted in the receptacles 17, 18 and 19 that are connected to the central office equipment. However, within the module 50 the pins 37 and 39 are connected to opposite ends of a resistor R1, thus providing a resistive short between pins 37 and 39. In a manner which will be apparent to one skilled in the art, this resistive short can be utilized at the central office to provide an indication that the associated tip and ring lines ST and SR are not in use.

Although not shown in FIG. 3, it will be apparent that the illustrated subscriber tip and ring lines ST and SR can be tested in the field by connecting thereacross the instrument 40 as shown in FIG. 2, first by applying one polarity to the tip and ring lines, and then 15 reversing the polarity as described above.

From the foregoing it will be apparent that the present invention provides relatively simple and inexpensive means for enabling a field worker first to select a pair of unused tip and ring lines, respectively, for possible connection to a new subscriber's telephone, and then to utilize the instrument 40, in combination with the module 30 or 50, to conduct, remote from the central office, a test which will indicate to the satisfaction of the worker as to whether or not the selected pair of unused tip and ring lines is in satisfactory operating order. For example, if in during the test conducted with the instrument 40 either of the tip and ring lines ST and SR, or both, have been severed, tone emitter 41 will not be energized regardless of the polarity of the voltage applied across the lines If line ST is shorted. on line SR, the tone emitter 41 will be energized regardless of the manner in which the battery 44 and tone emitter 41 are connected across ST and SR. Accordingly, for a very modest investment, a considerable amount of time and effort can be saved by utilizing the module 30 or 50 in the test procedures as noted above.

While this invention has been illustrated and described in detail in connection with only certain embodiments, it will apparent that it is capable of still further modification, and that this application is intended to cover any such modifications that fall within the scope of one skilled in the art or the appended claims.

We claim:

1. Apparatus for testing a pair of unused telephone tip and ring lines extending between a central office main frame and the site of a prospective telephone subscriber remote from said central office, comprising a first device removably mounted in said main frame and operatively connecting together said tip and ring lines at said main frame, a second, portable device for releasably connecting across said tip and ring lines at a point adjacent said site a direct current power source of reversible polarity, said second device including indicator means operative to produce a predetermined signal when said power source produces current flow in said tip and ring lines, and said first device including means for permitting DC current flow in one direction only in said tip and ring lines, whereby if said tip and ring lines are in satisfactory working order, said signal will be produced when said power source connected across said lines is of one polarity, but will not be produced when said power source is of the opposite polarity.

2. Apparatus as defined in claim 1, wherein said indicator means comprises an audible signal generator in series with said power source.

3. Apparatus as defined in claim 1, wherein said means for permitting current flow in one direction comprises a diode.

4. Apparatus as defined in claim 1, wherein said first device comprises a housing removably mounted on said main frame and having thereon a pair of spaced contacts, one of which is removably connected to said tip line, and the other of which is removably connected to said ring line, and said means for permitting DC current flow in one direction only comprises a diode mounted in said housing and operatively connecting said two contacts.

5. Apparatus as defined in claim 4, wherein said diode is a light-emitting diode.

6. Apparatus as defined in claim 4, wherein said housing has therein a third contact disposed to be connected releasably to a ground line in said main frame, and circuit safety means is operatively connected between said third contact and each of said pair of spaced contacts, thereby to prevent damage to circuitry at said central office.

7. Apparatus as defined in claim 4, wherein
said housing includes two, further, spaced contacts, and
a resistive short is interposed between and connects said two further contacts.

8. In combination with a telephone central office main frame of the type having a plurality of sockets to at least certain of which unused telephone tip and ring lines are connected, a device for releasably connecting together a pair of unused tip and ring lines, respectively, comprising
a housing,
a pair of spaced contact pins projecting from one side of said housing and slidably mounted in a registering pair of sockets in said main frame removably to support said housing on said frame,
the two sockets of said pair thereof being connected to said tip and ring lines, respectively, of said unused pair thereof, and
a diode mounted in said housing with its anode operatively connected to one of said pins, and with its cathode connected to the other of said pins.

9. The combination as defined in claim 8, wherein said diode is a light-emitting diode.

10. The combination as defined in claim 8, wherein
said housing includes a third pin projecting therefrom in spaced relation to the pins of the first-named pair thereof, and extending slidably into a further socket in said main frame, and
said further socket is connected to a ground line.

11. The combination as defined in claim 8, wherein
said housing includes two, further, spaced pins which project from said housing in spaced relation to the first-named pair of pins, and slidably into a second pair of sockets in said main frame, and
a resistive short is mounted in said housing and is connected at opposite ends thereof, respectively, to said two further pins.

12. The combination as defined in claim 10, including a pair of safety devices in said housing, each of said safety devices being connected to and extending between said third pin and one of the pins of said first-named pair, thereby to prevent damage to telephone circuits at said main frame.

13. A method of testing a pair of unused telephone lines at a point remote from the telephone central office main frame from which said lines emanate, comprising
connecting the two lines together at the main frame to permit direct current flow in one direction only in said lines,
testing said lines by connecting thereacross at a point remote from said main frame a test circuit comprising a signal generator in series with a direct current power supply having a first polarity with respect to said lines,
determining whether or not a signal is produced by said generator when said power supply has said first polarity with respect to said lines,
thereafter reversing the polarity of said power supply with respect to said lines, and
again determining whether or not a signal has been produced by said generator when said polarity has been reversed.

14. A method as defined in claim 13, including
selecting a pair of unused telephone lines from a plurality of pairs of telephone lines located adjacent said remote site,
said step of selecting a pair of unused lines comprising testing said pairs of lines for the presence of a dial tone, and selecting as unused lines a pair thereof which does not emit a dial tone.

15. Apparatus for testing a pair of unused telephone lines emanating from the main frame of a telephone central office, comprising,
a first device removably mounted in said main frame and releasably connecting said unused pair of lines together to permit DC current flow in one direction only through said lines,
a second, portable device disposed releasably to be connected across said unused lines at a point remote from said main frame,
said second device including a direct current power supply in series with an electrical signal generator operative to produce a signal when DC current flows therethrough, and
means for selectively connecting said second device across said lines in two different modes, in one of which said power supply has a first polarity with respect to said lines, and in the other of which said polarity is reversed.

16. Apparatus as defined in claim 15, wherein said first device includes a diode having its anode connected to one of said lines at said main frame, and its cathode connected to the other of said lines at said main frame.

* * * * *